May 12, 1970 A. B. STEEVER 3,511,616

FLUIDIZED BED REACTOR WINDBOX WITH SCAVENGING JETS

Filed March 31, 1967 2 Sheets-Sheet 1

INVENTOR.
ANDREW B. STEEVER
BY:

ATTORNEY.

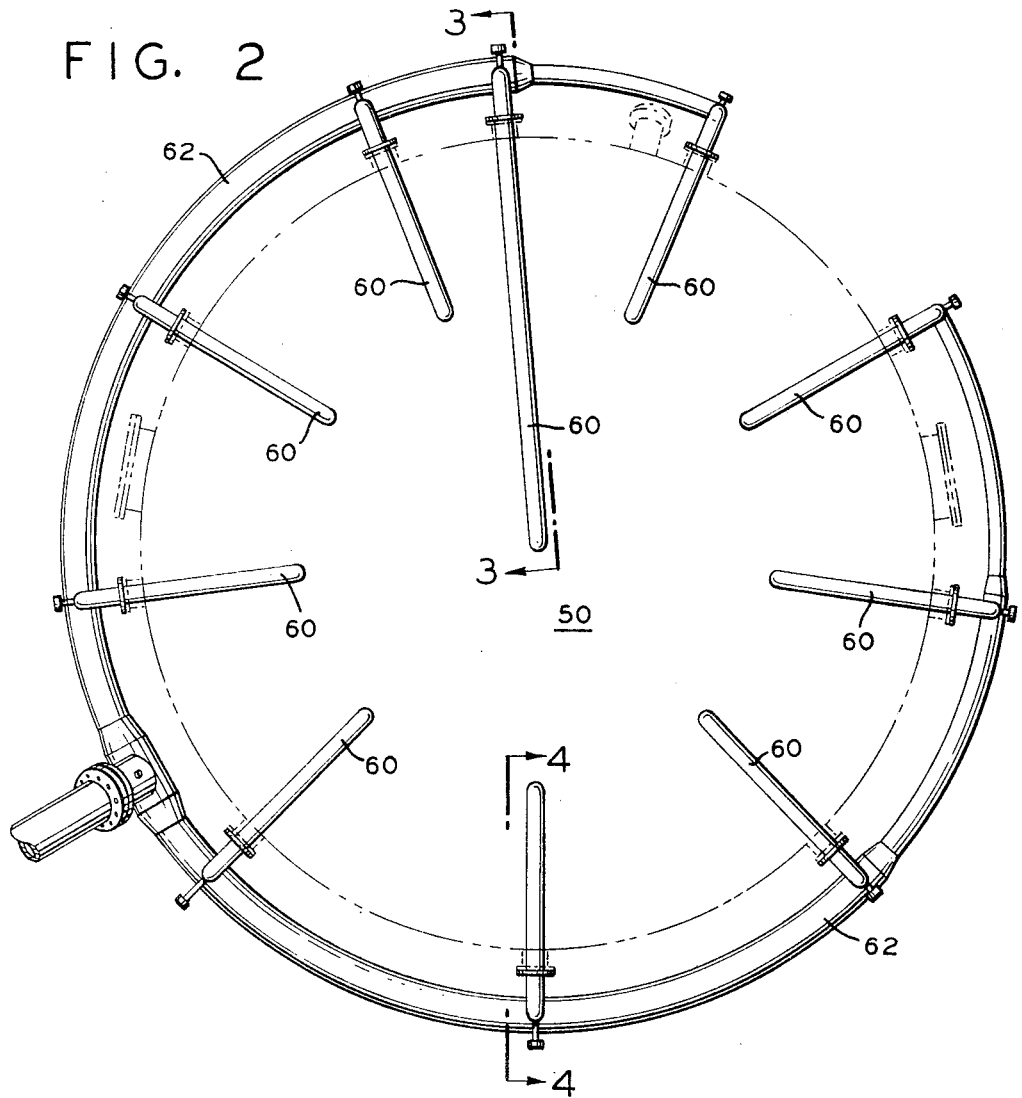
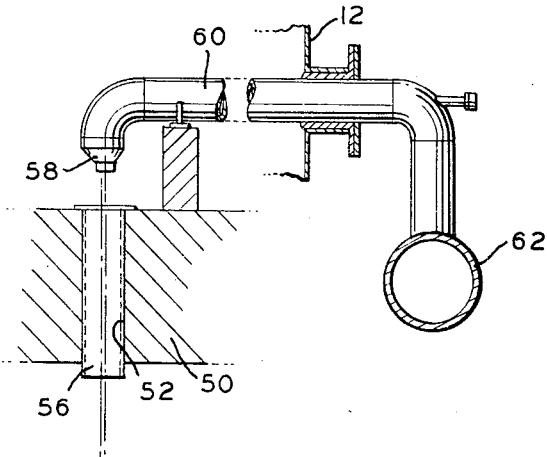

United States Patent Office 3,511,616
Patented May 12, 1970

3,511,616
FLUIDIZED BED REACTOR WINDBOX WITH SCAVENGING JETS
Andrew B. Steever, Old Greenwich, Conn., assignor to Dorr-Oliver Incorporated, Stamford, Conn., a corporation of Delaware
Filed Mar. 31, 1967, Ser. No. 627,489
Int. Cl. B01j 6/00; F27b 15/02
U.S. Cl. 23—284          3 Claims

ABSTRACT OF THE DISCLOSURE

The present invention relates to a multi-compartmented fluidized bed reactor and to an aspirating system which prevents fine solids and dust which may be deposited by the gas stream entering the hot windbox or material falling through the tuyeres in the bed above the hot windbox from remaining in the hot windbox.

---

Maintenance of a clean hot windbox has always been a considerable problem in the design and operation of multi-compartment fluidized bed reactors. Dust and solids entrained in the entering gases from the hot cyclone during operation and solids draining through the tuyeres of the preheat chamber during shut-down have combined to necessitate frequent cleaning of the hot windbox. Not only must the cleaning be done manually, which is expensive and time-consuming in itself, but it is a very noxious task in a close and disagreeable environment. In addition, certain types of feed materials, such as limestone and phosphate rock, tend to get sticky at elevated temperatures so that the fines entrained from the heat treating compartment will scale and plug up the tuyeres in the pre-heat compartment constriction plate. To alleviate this problem it has become necessary to use straight through or sifting type tuyeres for this constriction plate. This, however, only increases the hot windbox maintenance problem because the diameter of the tuyeres are so large that once the fluidizing gas is discontinued, as during shut-down, the entire contents of the pre-heat compartment will drain through the tuyeres into the hot windbox. While some of this material may be returned through the tuyeres into the pre-heat compartment when the fluidizing gas is reintroduced to the hot windbox, enough will remain in the hot windbox to necessitate shutdown and a cleanout.

The present invention obviates these problems by providing a series of openings in the dome between the hot windbox and the heat treating compartment to transfer the dust and solids which have been deposited in the windbox from the hot windbox to the heat treating chamber. In addition, applicant provides a series of high velocity aspirating jets, one for each drainage opening, to enhance the transfer system by increasing the operating area that each drainage opening can draw from and by increasing the speed of discharge from the hot windbox to the heat treating compartment.

Therefore it is an object of the present invention to provide a multi-compartment fluidized bed reactor having means to prevent the build-up of dust and solids in the hot windbox.

It is another object of the present invention to provide a multi-compartment fluidized bed reactor having a series of openings between the hot windbox and the heat treating compartment.

It is yet another object of the present invention to provide a multi-compartment fluidized bed reactor having a plurality of aspirating jets to discharge dust and solids accumulating in the hot windbox.

Still another object of the present invention is to provide a multi-compartment fluidized bed reactor for the economic and efficient calcination of ores having scaling properties.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

FIG. 2 is a plan view of the manifold and air feed conduit system for the aspirating jets of the present invention; and, FIG. 3 is an elevational view partly in section and with parts removed for clarity of showing of the manifold, air feed conduit and nozzle for an aspirating jet.

Figure 1:
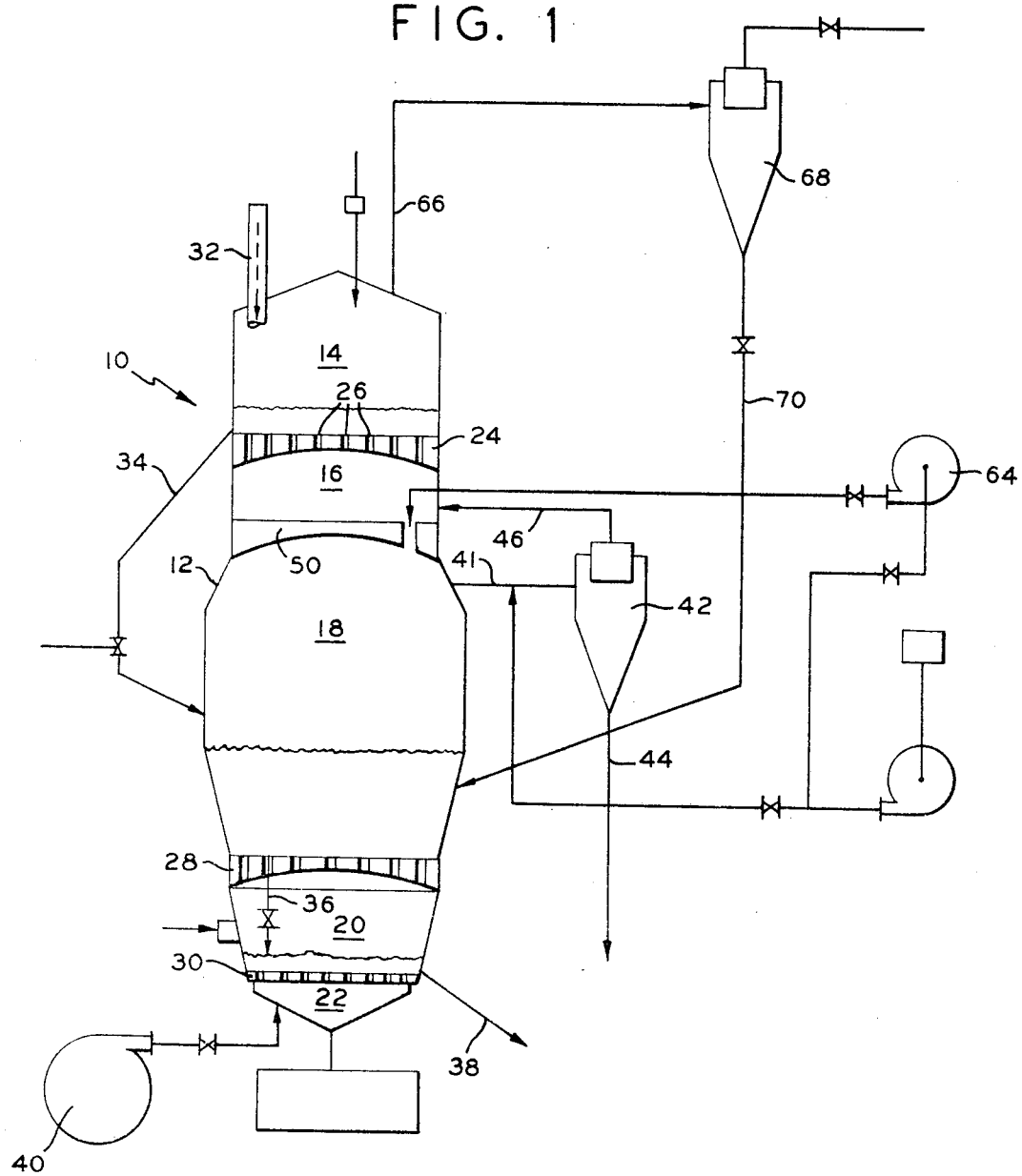
FIG. 1 is a diagrammatic representation of a multi-chamber fluidized bed reactor system incorporating the present invention.
Figure 1:

Referring now to FIG. 1 the multi-compartment fluidized bed reactor and an illustrative calcining process incorporating the instant invention will be briefly described. A fluidized bed reactor is basically a vertical furnace which is divided by a transverse, horizontally extending, gas permeable constriction plate into a windbox compartment below the plate and a heat treatment compartment above the plate. A bed of the feed material to be treated is supported on the plate and maintained in a fluidized state by air, or other oxygen bearing gas, being introduced through the constriction plate into the bed. The pressure of the fluidizing gas causes the solids to take on the appearance and many of the properties of a boiling liquid, i.e., a fluid level is present, there is almost instantaneous heat transfer and equalization of temperature throughout the bed, and the particles are constantly changing position relative to each other. The constant flux and movement of the bed particles causes the finer particles and dust to become entrained in the gaseous stream and rise with the gas through the bed and into the freeboard space above the bed.

Unless the oxidation or combustion being carried on in the heat treatment compartment is autogenous, auxiliary fuel, usually gaseous or liquid, is added to the bed to maintain the reaction temperature at the desired level. Solids to be treated are fed into the upper portion of the fluidized bed and the calcined products are removed from the bottom portion of the bed. The products of combustion are discharged from the top section of the heat treatment compartment and from there can be used to preheat incoming solids.

Looking now in particular to the calcining process shown in FIG. 1, the fluidized bed reactor 10 consists of a shell 12, a pre-heat compartment 14, a hot windbox 16, a calcining compartment 18, a cooling compartment 20 and a cold windbox 22. The pre-heat compartment 14 and the hot windbox 16 are separated from each other by a transverse constriction plate 24 having a plurality of orifices or tuyeres 26. Calcining compartment 18, cooling compartment 20, and cold windbox 22 are spaced apart from each other by constriction plates 28 and 30.

The ore to be treated is fed into the top of pre-heat compartment 14 by means well known in the art, such as conduit 32. After absorbing the desired amount of heat, in a manner to be presently described, the solids are transferred by gravity through conduit 34 into calcining compartment 18. As the solids are reduced to calcine they are transferred, again by gravity, through conduit 36 into cooling compartment 20 for subsequent discharge out of the reactor, through conduit 38.

Air is fed into cold windbox 22 by fan 40 and flows upward through constriction plate 30 to cooling compartment 20 and through constriction plate 28 to calcining compartment 18. The rising air is in direct heat transfer in cooling compartment 20, absorbing heat from the calcined solids, thereby cooling the solids, as it fluidizes and passes through the bed. The pre-heated air then fluidizes the bed and supplies the oxygen for the calcination reaction in compartment 18. The spent fluidizing gas rises into the freeboard space, above the bed, in calcining compartment 18 carrying with it fine solids and dust for discharge through conduit 41 into hot cyclone 42. A separation occurs in the hot cyclone 42 with most of the fine solids going to discharge through apex conduit 44, and the hot gases, carrying with them the remaining entrained fine solids and dust, being returned to the hot windbox of the reactor through conduit 46 to supply the fluidization gas for the bed in pre-heat compartment 14.

It is at this juncture that the maintenance problems in the hot windbox originate. The sudden loss in pressure and volocity of the air as it is transferred from the restricted volume of conduit 46 to the larger volume of the hot windbox 16 causes most of the remaining fine solids and dust that were entrained with the air from the hot cyclone to precipitate out and deposit themselves in the hot windbox. In addition, the eddy currents and resulting dead pockets in the hot windbox serve to settle out any remaining fine solids and dust that were still entrained in the fluidizing gas after the sudden loss in pressure and velocity. After an uneconomically short operating period the solids build up in the hot windbox has heretofor necessitated a costly and time-consuming shutdown for a cleanout. Once the supply of fluidizing air was discontinued the cleaning problem became a major operation. This is because certain ores, notably limestone and phosphorus rock, generate fine solids with severe scaling problems that requires the use of large diameters for the tuyeres, to prevent the tuyeres from plugging up and shutting down the system. These tuyeres are too large to support the bed when the air supply is cut off so the result is that the entire pre-heat compartment bed falls into the hot windbox.

Applicant has solved this problem by providing a series of openings in the dome between the calcining compartment and the hot windbox to transfer any fine solids and dust deposited in the hot windbox from the hot windbox to the calcining compartment. In addition, applicant incorporates a plurality of air jets, one immediately above each opening to enhance the scavenging system; first, to speed up the discharge from the hot windbox; and second, as an aspirator to enlarge the operating sphere of each discharge opening by providing a vacuum effect in the opening.

The dome plate 50 between the hot windbox 16 and the calcining compartment 18 has a plurality of openings 52 spaced about its periphery and an opening (not shown) at its center. Each opening has a metal liner 56 to reduce wear and increase the operating life of the dome. Spaced above each opening and directed downwardly into the center of the opening is an air jet nozzle 58. A plurality of air feed conduits 60, one for each nozzle, is connected at one end to the nozzle and at the other end to a circular manifold 62. The manifold receives the air from a fan 64 and transfers it to each feed conduit at the proper pressure and velocity. The static pressure in the calcining compartment 18 is greater than the static pressure in hot windbox 16 so that the velocity of the air jets must be high enough to prevent the spent fluidizing gas in the calcining compartment from avoiding conduit 41 and rising upward through the openings in the dome. As stated above the combined effect of the openings and the aspirating jets is sufficient to transfer any fine solids and dust which have become disentrained in the hot windbox from the hot windbox to the calcining compartment. Once the fine solids and dust enter the calcining compartment and leave the influence of the aspirating air jets they are re-entrained by the rising spent fluidizing gas and are again discharged through conduit 41 into hot cyclone 42. An added feature of the system is that should a shutdown of the reactor become necessary, the aspirating jets can be kept in operation and all of the solids from the pre-heat compartment that would normally be deposited in the hot windbox can now be blown into the calcining compartment.

The fluidizing air from the hot windbox rises through tuyeres 26 in constriction plate 24 to fluidize and pre-heat the incoming solids by direct heat transfer as it passes through the bed. The spent air is then discharged through conduit 66 to cold cyclone 68 for a final separation of fine solids and dust. The disentrained solids separated in cold cyclone 68 are returned to the calcining chamber for further treatment through conduit 70 and the air discharged either to atmosphere or to further treatment zones (not shown).

As the invention may be embodied in several forms without departing from the spirit or essential character thereof, the present embodiment is illustrative and not restrictive. The scope of the invention is defined by the appended claims rather than by the description preceding them and all embodiments which fall within the meaning and equivalency of the claims are, therefore, intended to be embraced by those claims.

I claim:

1. A fluidized bed reactor for treating finely divided particulate material, comprising a first and second treatment compartment spaced one above the other each containing a fluidized bed of material undergoing treatment, a windbox space between said treatment compartments for receiving fluidizing gas for said first compartment, a plate separating said windbox space from said second compartment, said plate having at least one opening communicating with said windbox space and said second compartment, a cyclone separator comparably associated with said windbox space and said second compartment, means for feeding material to be treated into said first compartment, means for transferring material from said first compartment to said second compartment, means for discharging treated material from said second compartment, means for introducing fluidizing gas into said second compartment at a velocity to fluidize the bed of solids maintained therein, said gas with entrained solids passing from said second compartment through said cyclone separator and into said windbox space and means in said windbox space above said opening for directing a stream of gas into said opening at a velocity sufficient to prevent the flow of uprising gases thereto and to transfer solid material deposited in said windbox space into said second compartment.

2. A reactor for the treatment of finely divided solids as defined in claim 1 wherein said last mentioned means comprises a nozzle, a conduit connected to said nozzle, and means to feed a gas to said conduit.

3. A reactor for the treatment of finely divided solids as defined in claim 2 wherein said opening has a wear resistant liner therein.

References Cited

UNITED STATES PATENTS 2,625,464   1/1953   Roberts et al.
2,684,869   7/1954   Lapple _____ 302—59

FOREIGN PATENTS 700,511   12/1953   Great Britain.

JAMES H. TAYMAN, JR., Primary Examiner

U.S. Cl. X.R.

23—1, 288; 34—10, 57; 55—342, 431, 474; 75—9; 263—21; 302—53, 59